June 21, 1932.  K. A. BRAUNING  1,863,742
COINCIDENTAL LOCK
Filed May 19, 1928
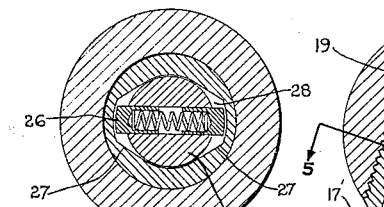
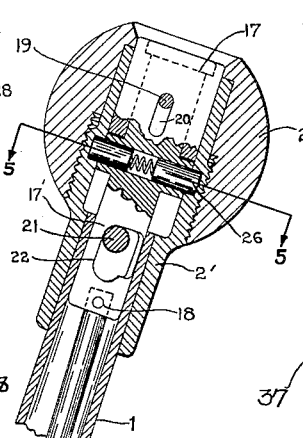
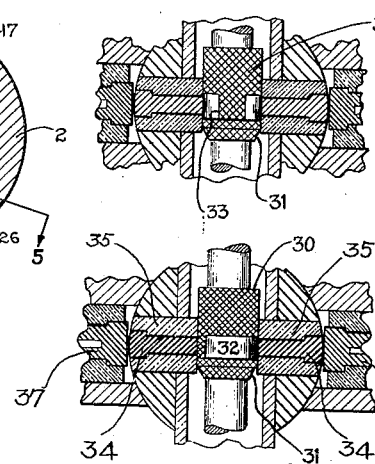
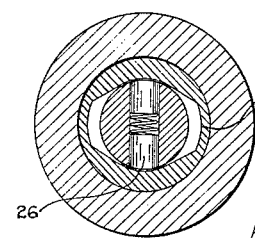
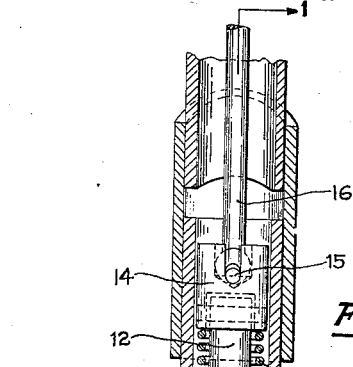
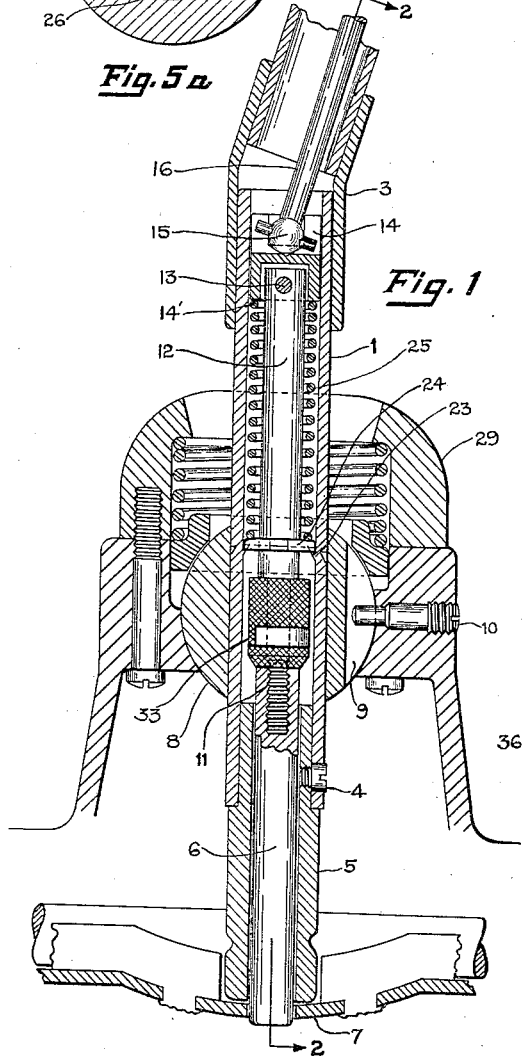
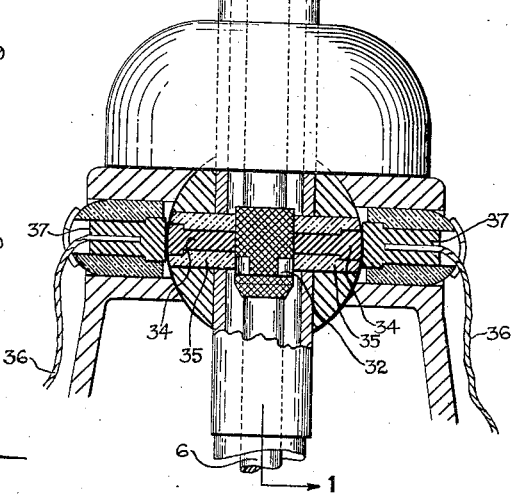
Karl A. Brauning
INVENTOR
BY A. H. Golden
ATTORNEY Patented June 21, 1932

1,863,742

UNITED STATES PATENT OFFICE

KARL A. BRAUNING, OF STAMFORD, CONNECTICUT, ASSIGNOR TO THE YALE & TOWNE MANUFACTURING COMPANY, OF STAMFORD, CONNECTICUT

COINCIDENTAL LOCK

Application filed May 19, 1928. Serial No. 279,151.

This invention relates to an automobile lock of the type in which a bolt is permitted to enter an operative unit of the automobile and prevent the same from being manipulated. In my invention, I have applied my lock to the gear shift mechanism, but it should be understood that it is possible to apply the same to any other desired unit of the vehicle.

My lock is of the coincidental type in which the locking mechanism operates in conjunction with a switch mechanism, so that whenever the ignition circuit is opened, the locking mechanism will become operative.

It is sometimes desirable, when the car is in motion to turn off the ignition to permit the car to coast and at the same time leave the mechanism unlocked. In prior locks, it has been possible to turn off the ignition manually without use of the key, when the lock has once been opened. By such an arrangement the co-incidental feature of the lock was destroyed, since once the lock was opened, and the locking bolt withdrawn, the key could be removed and the ignition circuit then manually operated at all times. In my lock, manual operation of the switch, is never possible except to absolutely lock the ignition and operating mechanism at one and the same time. In other words; I make it impossible to open the ignition circuit manually, without, at the same time locking some operative part of the car.

The invention is more fully described in the specification and in the drawing, wherein Fig. 1 is a section of my gear shift locking mechanism and the cylinder lock for operating the same, part of this figure being taken on the line 1—1 of Fig. 2. Fig. 2 is a partial section of Fig. 1 on the line 2—2. Fig. 3 is a view of the switch mechanism showing the circuit in open position. Fig. 4 is a similar view showing the circuit in closed position. Figs. 5 and 5A are sections of Fig. 1, taken at point 5—5, showing the position of the cylinder locking bolts in closed and open position respectively.

In the drawing, reference numeral 1 indicates the usual type of gear shift lever used in automobiles and 2 represents the usual gear shift ball super-imposed on the lever by means of the ball sleeve 2'. This lever 1, as shown is constructed for convenience in two parts connected with an elbow 3 and has connected at its lower end by a screw 4, a still lower portion 5 which acts as a bearing for the locking bolt 6. As shown in Figure 1, this bolt 6 is adapted to be thrown into a plate 7 whereby this plate will hold the gear shift lever from movement. A ball 8 is mounted on the lever 1 in any manner desirable and this ball acts as a bearing for the gear shift lever, as is usual in constructions of this type. This ball is slotted at 9 and a screw 10 fits into the same to limit the direction of movement of the ball in a rotary direction. This construction is of the usual type and since it forms no part of my invention, it need not be further described.

The bolt is constructed for convenience in two parts, the lower portion 6 being fastened by means of screw 11 to the upper portion 12. This construction is devised in order to simplify the manner of mounting insulation and contact points of the switch mechanism on the locking bolt. This bolt portion 12 is in turn fastened by a pin 13 to a universal cap mounting 14 which in turn is connected by the universal joint 15 to the rod 16. This rod 16 is in turn connected to the plug 17' of the cylinder 17 by means of the pin connection 18.

My cylinder locking mechanism is of unusual construction. It may be of either the sliding tumbler type or the pin tumbler type, since its internal locking construction is unimportant. A pin 19 shown in section in Fig. 1 is adapted to extend from a portion of the ball sleeve 2' into a slot 20 of the cylinder, so as to limit the vertical movement of the same and prevent its rotational movement.

As was previously described the rod 16 is fixed at the point 18 to the plug of the cylinder and has no connection with the cylinder shell itself. Thus, while the cylinder cannot rotate, the plug may rotate and move with it the rod 16 and the bolt mechanism 12 and 6. A pin 21 which extends from the ball sleeve 2' fits in a cut-away portion 22 of the plug and limits the movement of the same, both in a rotary and longitudinal direction.

The plug 17' of the cylinder 17 is equipped with locking bolts 26 which are more fully shown in Figs. 5 and 5A. While these bolts normally lie partially within the plug, (Fig. 5) they are not under the control of the plug in the usual manner. However, when the plug is rotated, these bolts will be acted on by the cam surfaces 27 of the grooves 28 to retract the same within the plug. This action is fully shown in Figures 5 and 5A, illustrating respectively the bolts in locking and unlocking position.

The gear shift rod 1 is hollow and is equipped at its inner surface with a shoulder 23, this shoulder 23 being the support for a ring 24 which in turn supports a spring 25. This spring 25 lying as it does, between the ring 24 and a shoulder 14' of the universal cap 14 tends to move the locking bar mechanism in an upward and unlocking direction.

It will now be quite obvious that when the plug 17' is rotated so as to cam its bolts 26 out of the locking groove 28, that the spring 25 will then be free to push the entire locking bolt assembly in an upward direction, so as to withdraw the bolt 6 from the locking plate 7 and permit future operation of the gear shift mechanism. This upward movement, is limited both by the pin 19 which controls the cylinder and the pin 21 which controls the plug.

In order to obtain the co-incidental feature, so desirable in automobile locks, I have devised a switch mechanism which consists of a contact mounted on the locking rod and adapted to cooperate with a series of contacts mounted in the usual gear shift ball 8 and the gear shift housing 29. This switch mechanism is fully shown in Figs. 1, 2, 3 and 4, and consists in part of two insulating members 30 and 31. The member 30 is equipped with a groove on which is mounted a contact member 32. This contact member 32 is in the form of a split ring adapted to permit the downwardly extending portion 33 of the insulating member 30 to enter between its two ends. These three members, 30, 31 and 32 are mounted on a portion of the locking rod 12 and are held thereon by the lower locking rod 6 through means of the screw connection 11. While I prefer to use this construction, it is of course obvious that any suitable manner of mounting the switch contact 32 between two insulating discs 30 and 31 would be adaptable for my purpose.

Figs. 1 and 2 illustrate my bolt mechanism in the locked position and the switch in the circuit opening position. As will be seen, the locking bolt in this position, fits within the plate 7, while the switch contact 32 rests in a plane below the switch contacts 34 mounted in the ball 8 and surrounded by the insulating member 35. In this position, the electrical circuit through the wires 36 contacts 37, and 34 is therefore open. The cylinder lock is also in its lower locking position with bolts 26 fitting within the locking groove 28 of the ball sleeve 2'.

Figs. 3 and 4 illustrate the position of the contacts when the the circuit is in open and closed position respectively. As was previously explained, key operation of the cylinder 17 will cause the entire locking bolt assembly to move to a level above that illustrated in Fig. 1 so as to withdraw the bolt 6 from the plate 7.

This rise to upper level is sufficient to carry the contact ring 32 into the plane of the contacts 34 of the ignition circuit. However, to allow this rise to an upper level, the locking rod and cylinder assembly were of necessity rotated a limited amount as determined by the pin and slot connection 21—22 of plug 17'. This rotation has brought the downward portion 33 of insulating ring 30 opposite contact 34 as illustrated in Fig. 3. Thus, when the lock is initially operated to release the gear shift lever, the ignition circuit is allowed to remain open.

To close this circuit it is merely necessary to rotate the lock assembly at its upper unlocking level until it is in the plane of Fig. 1 but at a higher level. The contacts will then be in the position of Fig. 4 and the circuit will be closed. If it is desired to coast, a simple turn of the lock back to the position of Fig. 3 will open the ignition circuit and yet leave the gear shift or other mechanism operative.

When the lock is in the position called for in Figs. 3 and 5A, the cylinder tumblers will prevent withdrawal of the key as will be understood by those skilled in the art. When the lock is in the position called for by Fig. 4, the plug bolts 26 will be in the plane of the grooves 28 but at a higher level and since the tumbler chambers will be alined the key may be withdrawn as will be readily understood. In order to lock the assembly it will then be necessary merely to press downward on the cylinder 17 against the pressure of spring 25. The bolts 26 will enter the grooves 28 when they reach the proper level and the assembly will once more be in the position of Fig. 1.

What I claim is:

1. In a coincidental lock, a locking bolt, a lock for reciprocating and rotating said bolt when key operated, an ignition circuit, control means for said circuit and means carried by said locking bolt for operating said control means when reciprocated or when rotated by said key operated lock.

2. In a coincidental lock, an ignition circuit switch, a locking bolt having a rotating and reciprocating movement, one of said movements being adapted to bring the bolt to locking position, a lock fixed to said bolt and movable therewith, said lock being adapted to lock said bolt in locking position, and a part of said switch connected with said bolt and adapted to make or break the circuit at the limits of each of the bolt movements.

3. In a coincidental lock, an ignition circuit switch, a locking bolt having a two way movement, one of said movements being adapted to bring the bolt to locking position, a lock fixed to said bolt and movable therewith, said lock being adapted to lock said bolt in its locking position, and a part of said switch connected with said bolt and adapted to make or break the circuit at the limits of each of the two way movements of the bolt.

4. In a coincidental lock, an ignition circuit switch, a locking bolt adapted to lie in a lower locking position or an upper releasing position, a lock plug fixed to said bolt and movable therewith, said plug being adapted to lock said bolt in its lower locking position, a part of said switch operable with said bolt and positioned to break the circuit when the bolt is in its lower locking position, said plug being key operable to release the bolt for movement to upper releasing position, said plug being key operable to rotate with said bolt at said upper position, said last rotary movement being adapted to make and break the ignition circuit by means of said switch part.

5. In an automobile lock, a locking bolt adapted to be reciprocated from locking to unlocking position, a lock for controlling said bolt, said lock being fixed to said bolt and adapted to rotate therewith to liberate the same when in locked position for reciprocation to unlocked position, an ignition switch associated with the locking bolt, said bolt having a switch operating element adapted to lie in circuit opening position when the bolt is in the lower locked position and also when in the upper unlocking position reached by said initial rotation and reciprocation.

6. In a coincidental lock, a reciprocating and rotating bolt, a lock fixed thereto and adapted to hold the same in automobile locking position, said bolt and lock being adapted to be rotated by key to release the bolt for reciprocating movement to automobile releasing position, an ignition circuit associated with said bolt and including a contact carried by said bolt, said contact being adapted to lie in circuit opening position when the bolt is in its locking position, and to lie in circuit opening position when the lock and bolt are initially rotated and reciprocated to unlocking position, said contact being adapted to move to circuit closing position when said bolt and lock are rotated a predetermined amount while in their unlocking position.

7. In a coincidental lock, a locking bolt, a lock fixed to said bolt and adapted to maintain the same in a lower locking position, an ignition circuit switch including a contact carried by said bolt, said contact being in circuit opening position when said bolt is in its lower locking position, said lock being adapted to be key rotated to release the bolt and move therewith to an upper releasing position, said contact being adapted to lie in circuit opening position at this upper position, said locking bolt and lock being rotatable while in said upper position to move said contact to circuit closing position.

8. In a coincidental lock, a reciprocating and rotating locking bolt, a cylinder lock fixed thereto and adapted to maintain the same in locking position, an ignition circuit including a pair of contacts, a third controlling contact carried by said locking bolt adapted to open and close the circuit when in a predetermined position relatively to said pair of contacts, said controlling contact being maintained in circuit opening position below said pair of contacts when the bolt is in locking position, said contact being movable with said bolt when the same is initially rotated and reciprocated with the cylinder lock to unlocking position, said rotation being adapted to place said controlling contact in open position at the level of said pair of contacts, said cylinder and bolt being rotatable at this level to then bring the control contact into position to close the circuit.

9. In an automobile lock, a locking bolt, a lock plug fixed thereto, a pair of bolts carried by said plug and adapted to maintain the locking bolt in locked position, said locking bolt and plug being rotatable together to withdraw said pair of bolts and release the locking bolt.

10. In an automobile lock, a locking bolt, a cylinder lock plug fixed to said bolt, a latching bolt carried by said plug adapted to maintain the same and said locking bolt in locked position, said latching bolt being adapted to lie partially within the plug and partially within a cam shaped locking groove when in locking position, the locking bolt and plug being rotatable to cam the latching bolt out of the groove and entirely within the plug to release the same from locked position.

11. In a coincidental lock, a locking bolt, a lock for reciprocating and rotating said bolt when key operated, an ignition circuit, and means carried by said locking bolt for operating said ignition circuit when said bolt is reciprocated or rotated by said key-operated lock.

12. In a coincidental lock, a locking bolt, a key operated lock adapted to reciprocate and rotate said bolt, said bolt being inaccessible for other operation, an ignition circuit, and means operable by said locking bolt for operating said ignition switch when said bolt is reciprocated or rotated by said key operated lock.

Signed at Stamford, in the county of Fairfield and State of Connecticut, this 17th day of May, A. D. 1928.

KARL A. BRAUNING.